(12) United States Patent
Namgung

(10) Patent No.: US 6,848,536 B2
(45) Date of Patent: Feb. 1, 2005

(54) RACK ASSIST TYPE ELECTRIC POWER STEERING SYSTEM

(75) Inventor: Joo Namgung, Wonju (KR)

(73) Assignee: Mando Corporation (KR)

( * ) Notice: Subject to any disclaimer, the term of this patent is extended or adjusted under 35 U.S.C. 154(b) by 0 days.

(21) Appl. No.: 10/385,292

(22) Filed: Mar. 10, 2003

(65) Prior Publication Data

US 2003/0178244 A1 Sep. 25, 2003

(30) Foreign Application Priority Data

Mar. 14, 2002 (KR) .................................. 10-2002-0013807

(51) Int. Cl.[7] .................................................. B62D 5/04
(52) U.S. Cl. ....................................................... 180/444
(58) Field of Search .......................... 180/443, 444–446

(56) References Cited

U.S. PATENT DOCUMENTS 5,927,429 A * 7/1999 Sugino et al. .............. 180/444
2002/0003059 A1 * 1/2002 Yoshioka et al. ........... 180/444
2002/0036111 A1 * 3/2002 Noguchi ..................... 180/444
2003/0019686 A1 * 1/2003 Fukuda et al. .............. 180/444

* cited by examiner

*Primary Examiner*—Kevin Hurley
(74) *Attorney, Agent, or Firm*—R. Nell Sudol; Henry D. Coleman; William J. Sapone

(57) ABSTRACT

The present invention relates to a rack assist type electric power steering system, and in particular to an improved rack assist type electric power steering system which is capable of decreasing a processing section of a ball screw by improving an installation position and structure of a ball screw, protecting a connector and sensor of a motor assembly from a heat source and preventing any interference of parts due to a drooping of a rack bar. The system according to the present invention includes a rack bar, an input shaft, a rack housing, a torque sensor which surrounds an upper surrounding portion of the input shaft and is fixed to an upper portion of the rack housing; a second rack housing which surrounds the straight line section of the rack bar and contacts by a bush inserted into an inner diameter portion of the same, and a motor assembly.

4 Claims, 7 Drawing Sheets

Prior Art

Present Invention

Ra < Rb < Rc

RACK ASSIST TYPE ELECTRIC POWER STEERING SYSTEM

BACKGROUND OF THE INVENTION

1. Field of the Invention

The present invention relates to a rack assist type electric power steering system, and in particular to an improved rack assist type electric power steering system which is capable of decreasing a processing section of a ball screw by improving an installation position and structure of a ball screw, protecting a connector and sensor of a motor assembly from a heat source and preventing any interference of parts due to a drooping of a rack bar.

2. Description of the Background Art

Generally, an electric power steering system is directed to increasing a steering force using an electric force. In particular, a rack assist type electric power steering system (R-EPS) is directed to reciprocating a rack bar using a motor assembly installed between a rack bar and a rack housing. FIG. 1 is a view illustrating a conventional rack assist type electric power steering system.

As shown therein, a torque sensor 20 is installed in a portion which is vertical from an intermediate portion of a rack housing 10, and an input shaft 21 is installed in the interior of the same for thereby receiving a rotational force when a driver rotates a steering wheel. A pinion gear 22 is installed in a lower portion of the input shaft 21.

In addition, a rack gear 12 engaged with the pinion gear 22 is installed in the interior of the rack housing in an intermediate portion of the same. A support yoke is installed in a rear side of the rack gear 12 for thereby constantly pushing the same in the direction of the pinion gear 22. A tie rod 30 is installed at both sides of the rack bar 11 and is connected with a tire wheel of a vehicle for thereby steering the same.

A motor assembly 40 is installed in the other side of an intermediate portion of the rack housing 10. The motor assembly 40 includes a motor housing 41 connected with the rack housing 10, a stator 42 and a rotator 43 which are installed in the interior of the motor housing 41, and a motor shaft 44 which is fixedly installed in an inner side of the rotor 43 and cooperates with the rotor 43.

A ball screw 50 is installed in an outer surface of the rack bar 11 and is formed of a screw shape groove of a semi-circular cross section for thereby converting a rotational force of the motor shaft 44 into a reciprocating force of the rack bar 11. A ball nut 60 which has a screw shape groove of a semi-circular cross section and a ball(not shown) is installed in the interior of the same, corresponding to a ball screw 50.

At this time, the ball nut 60 includes a return structure in such a manner that a ball circulates in the interior of the same. An end of the motor shaft 44 in which the ball nut 60 is installed is outwardly expanded so that the ball nut 60 is inserted thereinto, and a front end of the same is bent and fixes the inserted ball nut 60 in an axial direction and a radius direction.

In addition, A bush 13 is installed in the interior of an intermediate side of the rack housing 10 for thereby preventing a movement of the rack bar 11 in an axial direction and a drooping of the intermediate side of the same. Therefore, the rack bar 11 is supported by three points by a support yoke(not shown) of one side of the bush 13 of the intermediate side and the ball nut 60 of the other side.

In addition, the both ends of the rack housing 10 are formed in hollow, and a rack stopper 70 is formed in order for the rack bar 11 to be movable therein. The outer side of the rack stopper 70 are divided into two portions for thereby connecting the tie rod 30 and the rack bar 11, and an inner ball joint 31 is installed between the two portions.

At this time, the inner ball joint 31 has a diameter larger than the inner diameter of the rack stopper 70. Therefore, when a lock to lock operation in which the rack bar 11 is moved in the direction of one end in maximum is performed, the inner ball joint 31 is closest to the rack stopper 70, so that the movement is limited for thereby determining a stroke of the rack bar 11.

However, the above described conventional rack assist type electric power steering system has the following problems.

First, there is a problem in the supporting structure of a relatively thin and longitudinal rack bar 11.

The rack bar 11 reciprocates in the longitudinal direction in the interior of the rack housing 10. The first support point of the same is a portion in which a pinion 22 of a lower portion of the input shaft 21 is connected, and the above support point is a portion in which the support yoke which assembling in a back side of the rack housing is continuously pressed.

The second support point is a ball nut assembling portion which is assembled at an end portion of the other side of the rack bar. This portion is installed in an inner diameter side of the housing.

In the case that the first and second support points are supported, a drooping problem occurs in the intermediate portion. In order to prevent the above drooping problem at the intermediate portion, the bush 13 is interposed in the inner diameter portion of the rack housing.

However, in the case that the assembling is performed by inserting the bush 13 into an intermediate portion, the fabrication process and assembling process are complicated.

In the most preferred examples, there should be provided a first support point by the support yoke which supports a rack gear portion by positioning the ball nut at an intermediate portion of the rack bar, a second support point by the ball nut 60 of the intermediate portion, and a third support point by the bush 13 inserted at the end portion.

However, in order to position the ball nut at an intermediate portion of the rack bar based on the above described manner, since the section of the ball screw formed in the rack bar is more elongated rather than the section in which the ball nut actually runs, so that the section of the ball screw is unnecessarily extended, and the fabrication cost is increased.

In addition, the vertical load applied to the rack bar since the ball nut is positioned at an end portion of the rack bar is most applied at the ball nut among three points(support yoke, bush and ball nut), for thereby generating a vibration and noise at the ball nut, and the durability of the ball screw is decreased.

Second, the sensor of the connector and motor assembly is positioned at an intermediate portion of the steering system which includes the rack bar, the sensor is located nearest a exhaust manifold(not shown) of an engine which is located at a center portion of an engine room. Therefore, even when the function of a heat resisting property is maximized, the sensor is easily damaged by a exhaust heat of the engine, and the life span of the same is decreased.

Namely, as shown in FIG. 1, in the structure in which the ball nut is positioned at an end portion of the rack bar, the motor assembly is located at an intermediate portion, and the connector which is an accessory of the motor assembly positioned at an intermediate portion should be positioned at an intermediate portion, the system is largely affected by a exhaust heat which is generated in the exhaust manifold.

Third, the drooping problem of the rack bar occurs due to a self-weight which is vertically applied to the rack bar in the vehicle. A certain interference may occur between the ball screw of the rack bar and the rack stopper by the above drooping problem. At this time, an abnormal friction problem may occur due to the interference.

Fourth, in the conventional construction, since the rack housing, the motor housing connected to the rack housing and the motor assembly which includes the motor housing are assembled at the same time, the test(durability, anti-vibration, noise, performance, etc.) of the motor should be performed after the assembling process.

Therefore, in the case that the tests are not successful because the state of the motor is bad, the whole steering system may have an error.

SUMMARY OF THE INVENTION

Accordingly, it is an object of the present invention to provide a rack assist type electric power steering system which overcomes the problems encountered in the conventional art.

It is another object of the present invention to provide a rack assist type electric power steering system which is capable of decreasing a processing section of ball screw by installing a ball screw at an intermediate portion of a rack bar and decreasing a diameter of an end portion of a rack bar.

It is further another object of the present invention to provide a rack assist type electric power steering system which is capable of protecting a connector and sensor of a motor assembly from a exhaust heat transferred from a exhaust manifold of an engine.

It is still further another object of the present invention to provide a rack assist type electric power steering system which is capable of decreasing a drooping of a rack bar, decreasing an interference between parts due to a drooping of a rack bar, and distributing a load concentrated to a ball nut.

It is still further another object of the present invention to provide a rack assist type electric power steering system which is capable of decreasing an error ratio by performing a test of a motor assembly before a rack housing is integrally assembled.

To achieve the above objects, there is provided a rack assist type electric power steering system which includes:

a rack bar which includes a screw hole for connecting an inner ball joint at left and right ends in an end surface and a ball screw provided in an intermediate portion, a rack gear provided in one side of the same, and a straight line section provided in the other side of the same;

an input shaft which is engaged with a pinion of a lower portion in a rack gear portion of the rack bar;

a rack housing which is formed in such a manner that a rack gear portion of the rack bar and the input shaft are concurrently surrounded and has a support yoke for supporting a rear portion of the rack gear;

a torque sensor which surrounds an upper surrounding portion of the input shaft and is fixed to an upper portion of the rack housing;

a second rack housing which surrounds the straight line section of the rack bar and contacts by a bush inserted into an inner diameter portion of the same; and a motor assembly which includes:

a cylindrical motor housing which connects both end portions to the rack housing and the second rack housing, respectively, between the rack housing and the second rack housing;

a stator which is fixed to an inner diameter portion of the motor housing;

a hollow motor shaft which is inserted into a surrounding portion of the ball screw of the rack bar in the interior of the motor housing;

a rotor which includes a plurality of magnets attached along an outer surrounding surface of the motor shaft;

a ball nut which is fixed to an inner diameter of the motor shaft and includes a plurality of balls; and a motor assembly which includes a plurality of bearings interposed between the motor shaft and the motor housing; and a connector which includes a through hole in one side of the motor housing and extends a power coil of the stator through the through hole and connects the same.

BRIEF DESCRIPTION OF THE DRAWINGS

The present invention will become better understood with reference to the accompanying drawings which are given only by way of illustration and thus are not limitative of the present invention, wherein.

Figure 1:
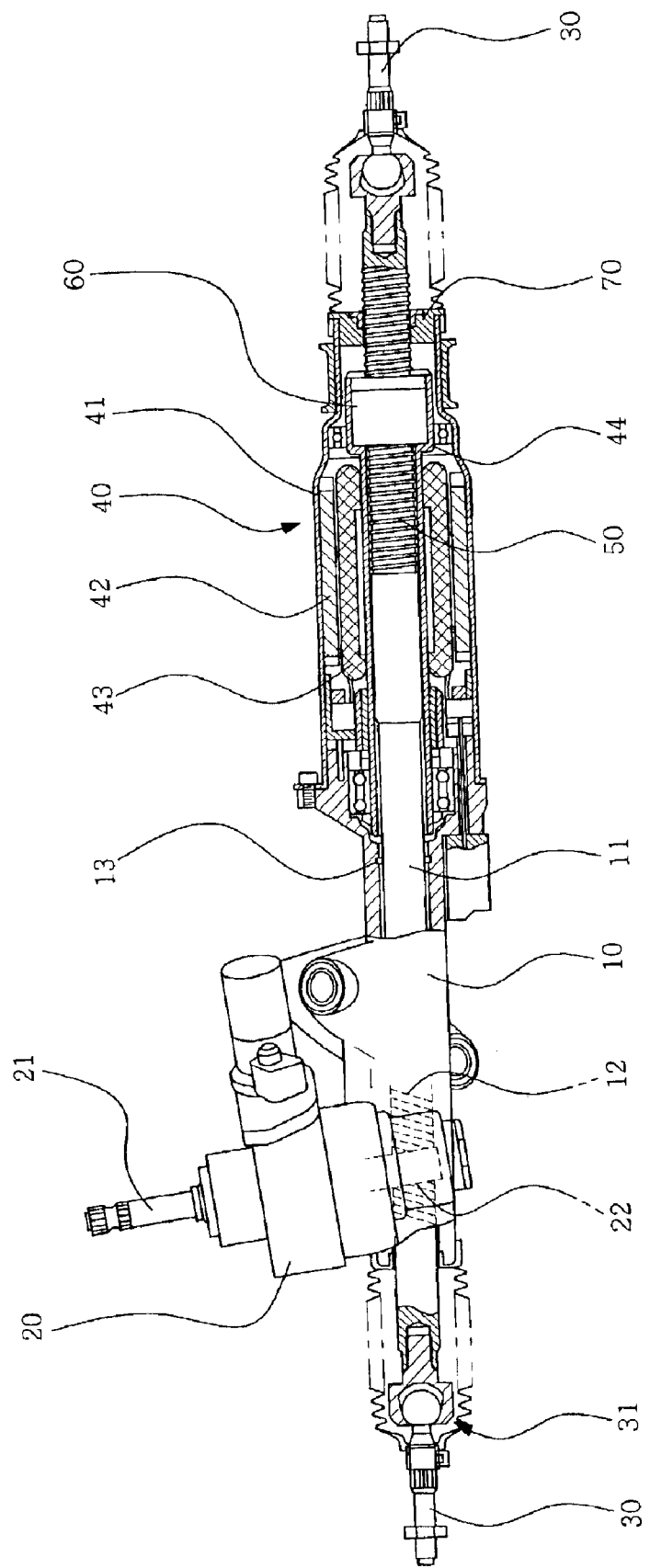
FIG. 1 is a front view illustrating a conventional rack assist type electric power steering system.

Descriptions of reference numerals of major elements of the drawing

| | |
|---|---|
| 100: transmission | 101: exhaust pipe |
| 110: rack housing | 111: rack bar |
| 112: rack gear | 113: support yoke |
| 114: bush | 120: torque sensor |
| 121: input shaft | 130: tie rod |
| 131: inner ball joint | 140: motor assembly |
| 141: motor housing | 142: stator |
| 144: motor shaft | 145: connector |
| 146: sensor | 150: ball screw |
| 151: straight line section | 160: ball nut |
| 162: lock screw | 170: rack stopper |

DETAILED DESCRIPTION OF THE PREFERRED EMBODIMENTS

Figure 2:
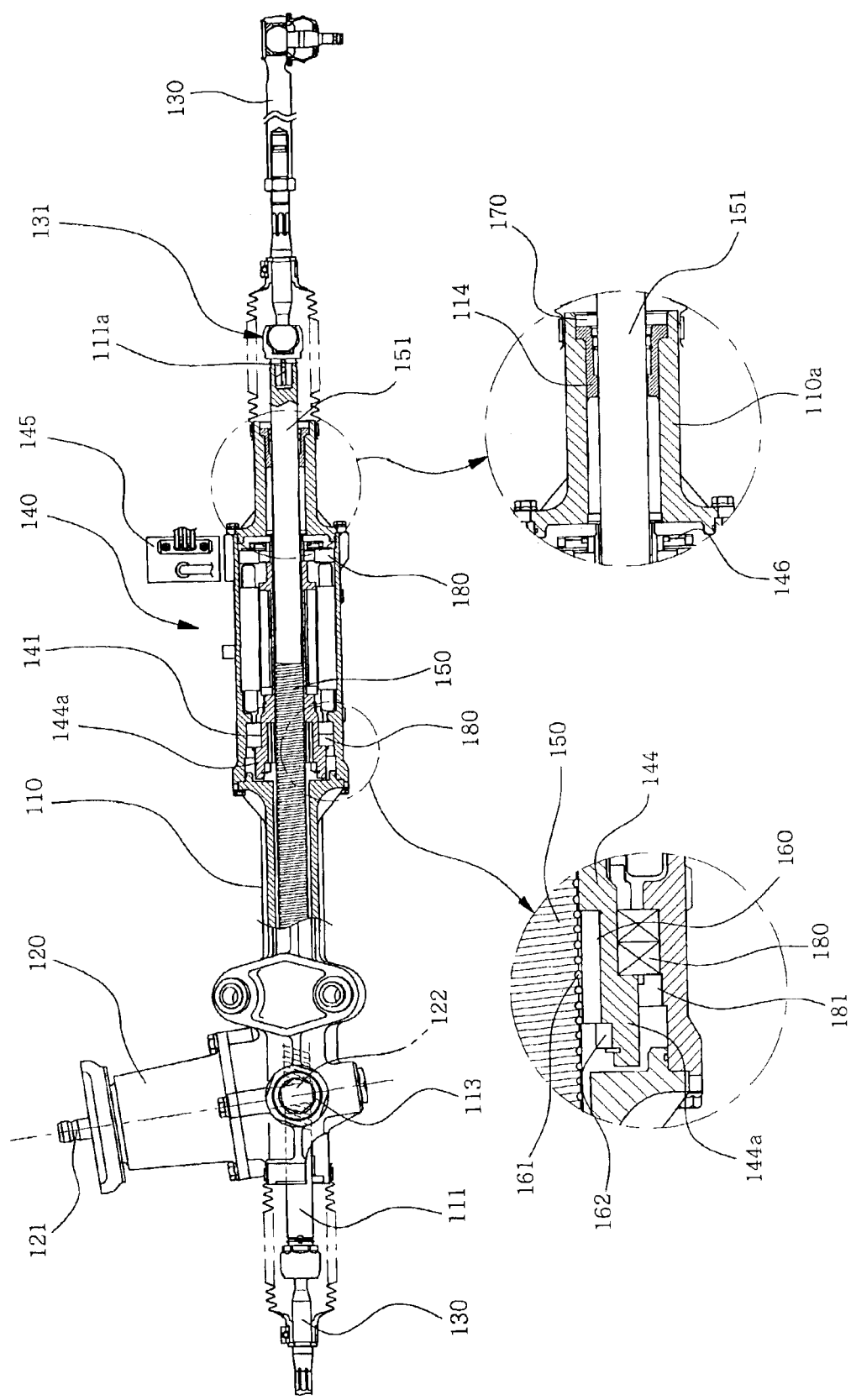
FIG. 2 is a front view illustrating a rack assist type electric power steering system according to the present invention.

FIG. 2 is a front view illustrating a rack assist type electric power steering system according to the present invention.

As shown therein, the steering system according to the present invention includes a rack bar 111, an input shaft 121 for guiding a direction for an operation of the rack bar, a rack housing 110 for housing the same, and a motor assembly 140 which provides an energizing force to the rack bar.

The rack bar, having a screw hole 111a for connecting an inner ball joint 131 to an end surface of the left and right sides, includes a intermediate ball screw 150, a rack gear 112 of one side portion, and a straight line section 151 of the other side portion.

In addition, the input shaft 121 is selectively capable of performing a left and right rotation based on an operation of a steering wheel provided in a driver's seat. The pinion 122 provided in the lower side is engaged to a portion of the rack gear 112 of the rack bar for thereby implementing a left and right operation.

The rack housing 110 is formed of a horizontal cylindrical portion which surrounds the rack gear 112 of the rack bar 111 and a vertical cylindrical portion which surrounds the input shaft 121. At this time, there is provided a support yoke 113 for constantly supporting a rear portion of the rack gear in a rear side of the horizontal cylindrical portion. In addition, a torque sensor 120 is installed in an upper portion of the vertical cylindrical portion.

A motor assembly 140(which will be descried later) is provided in an intermediate portion of the rack bar 111, namely, in a portion where the ball screw 150 is formed. A second rack housing 110a is assembled to a straight line section 151.

Figure 4:
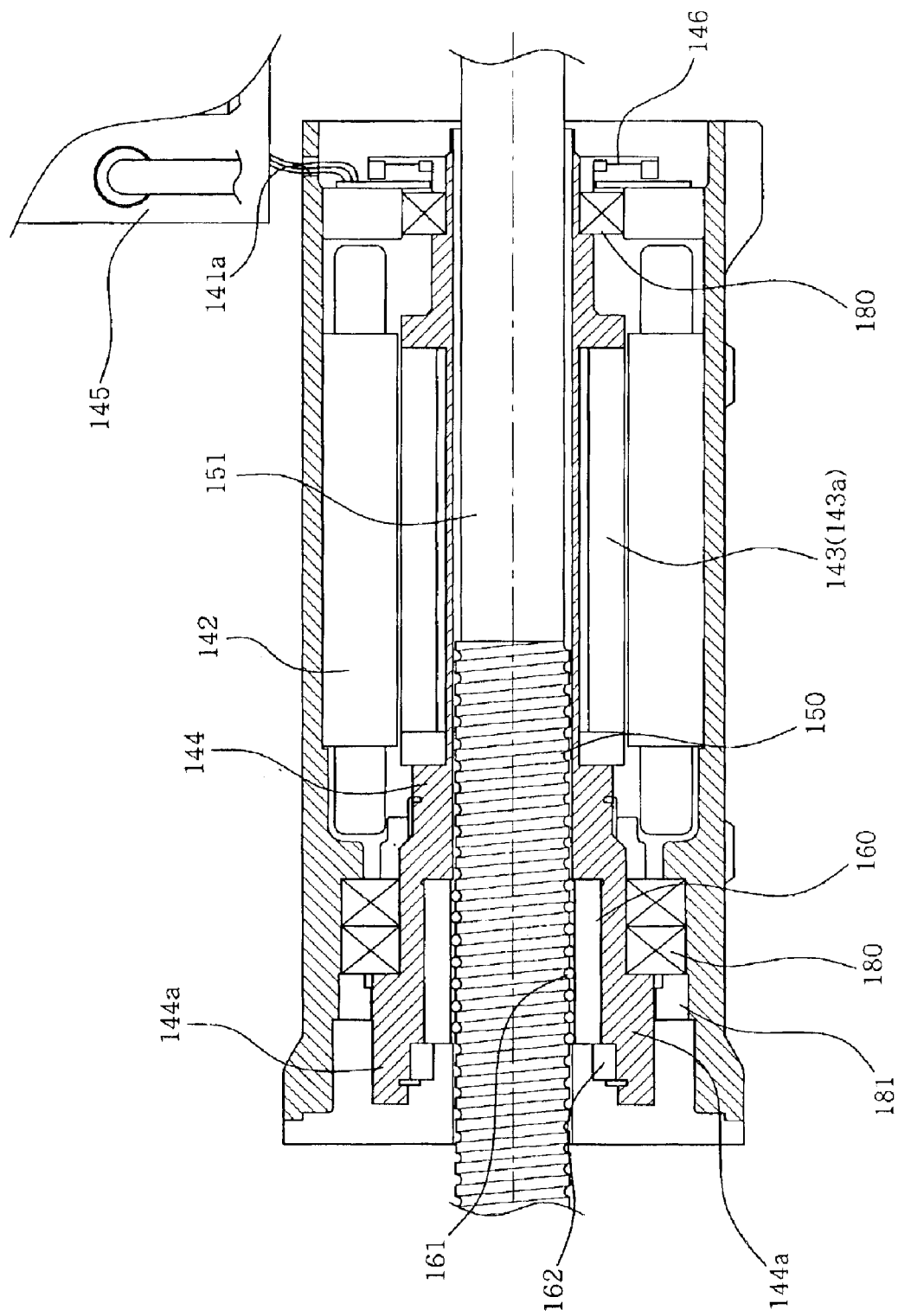
FIG. 4 is a view illustrating the construction of a motor assembly according to the present invention.

The motor assembly 140 includes a cylindrical motor housing 141 which connects its both ends to the rack housing 110 and the second rack housing 110a between the rack housing 110 and the second rack housing 110a, a stator 142 which fixed to an inner diameter portion of the motor housing 141, a hollow motor shaft 144 which is inserted into a surrounding portion of the ball screw 150 of the rack bar in the interior of the motor housing, a rotor 143 (Shown in FIG. 4) which includes a plurality of magnets 143a attached along an outer surrounding surface of the motor shaft, a ball nut 160 which is fixed to an inner diameter portion of the motor shaft and includes a plurality of balls 161, and a plurality of bearings 180 which are interposed between the motor shaft 144 and the motor housing 141.

In addition, a bush 114 is inserted into an inner diameter portion of the second rack housing 110a and surrounds the straight portion 151 of the rack bar.

In addition, a connector 145 is provided in one side of the motor housing 141, and a through hole 141a is formed in one side end of the motor housing 141 for thereby extending a power coil of the stator through the through hole.

The following points are important in the system according to the present invention.

Namely, in the motor assembly 140, an expanded portion 144a is formed on one end of the motor shaft 144, and a ball nut 160 is fixed to an inner or small diameter portion of the motor shaft 144.

The rack bar 111 is supported by a ball nut 160 installed in the interior of the motor assembly 140 for preventing a drooping at its intermediate portion. One side end of the same is supported by a support yoke 113 which supports a back surface of the rack gear 112, and the other side end of the same is supported by the bush 114 which interposed in the interior of the second rack housing 110a.

In addition, the connector 145 includes a through hole 141a at one side end of the motor housing 141 for thereby being distanced far away from the exhaust manifold. A power coil of the stator is extended through the through hole 141a.

In the drawings, reference numeral 130 represents a tie rod connected to an inner ball joint 131, reference numeral 181 represents a clamping nut for supporting the bearing 180 which is interposed between the motor shaft 144 and the rack housing 110, and reference numeral 162 represents a locking nut for fixing the ball nut.

Figure 3:
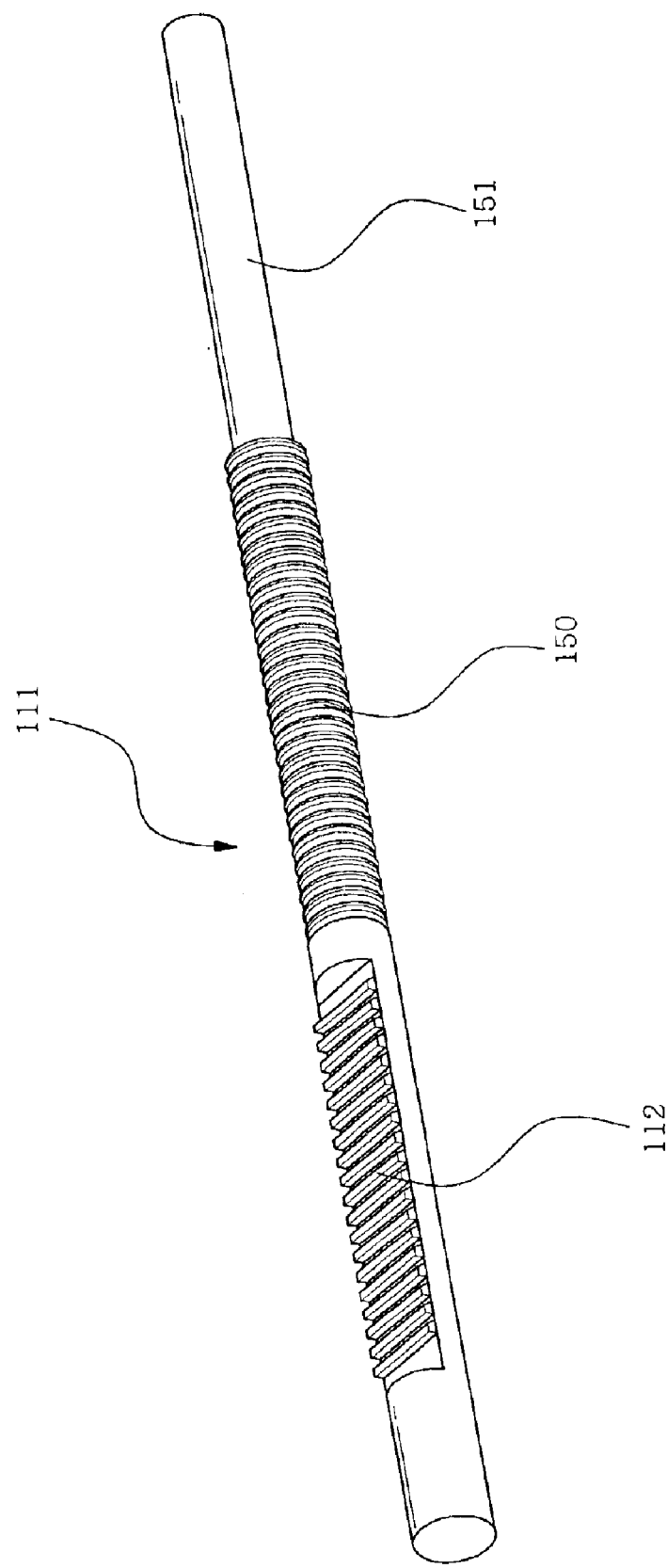
FIG. 3 is a front view illustrating a rack bar according to the present invention.

As shown in FIG. 3, in the rack bar 111 according to the present invention, a ball screw 150 is formed in an intermediate portion, and an undercut straight line section 151 is formed in one end side, and a rack gear 112 is formed in the other end side for thereby being engaged with a pinion gear(not shown), and a support yoke 113 is installed in a rear side of the rack gear 112 for pushing in the direction of the pinion gear.

Therefore, in the present invention, it is possible to decrease a processing section of the ball screw 150. It is possible to protect the connector 145 and the sensor 146 of the motor assembly 140. It is possible to prevent any interference between parts due to a drooping of the rack bar 111, and it is possible to effectively distribute the load concentrated at the ball nut 160.

Namely, the drooping problem of the rack bar 111 occurs due to the load which is vertically applied to the rack bar 111 in the vehicle. In particular, the load is most applied to an end portion(roughly point c in FIG. 5) of the rack bar 111. In order to prevent the above load, a ball screw 150 is provided in an intermediate portion(point b) of the rack bar 111 between the support yoke 113 and the bush 114.

Figure 5:
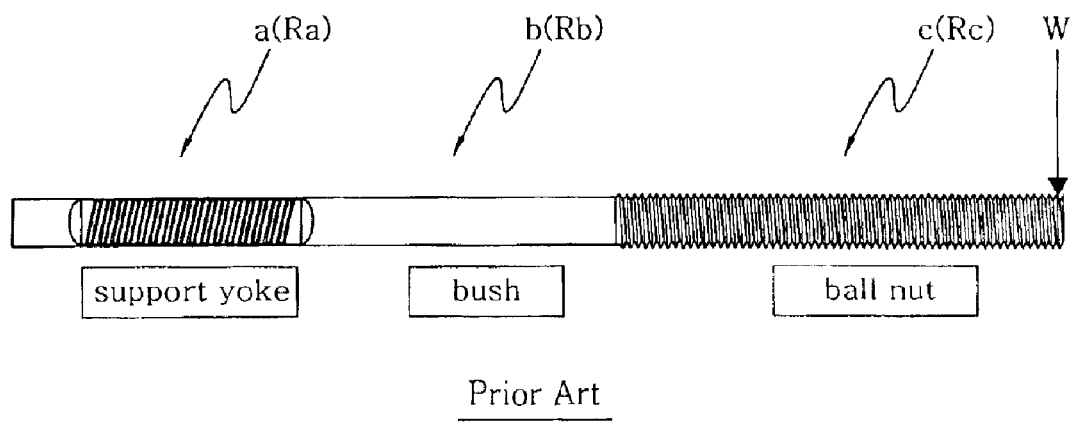
FIG. 5 is a view illustrating a distribution of a load of a rack bar according to the present invention.
Figure 5:
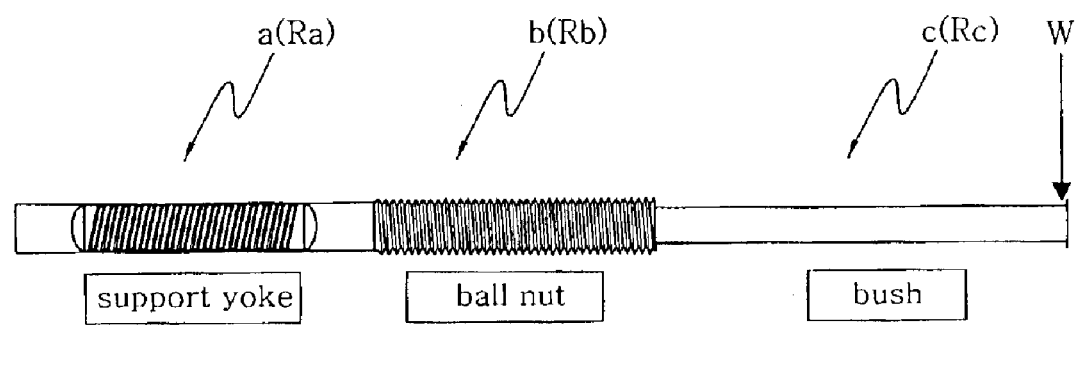
Figure 6:
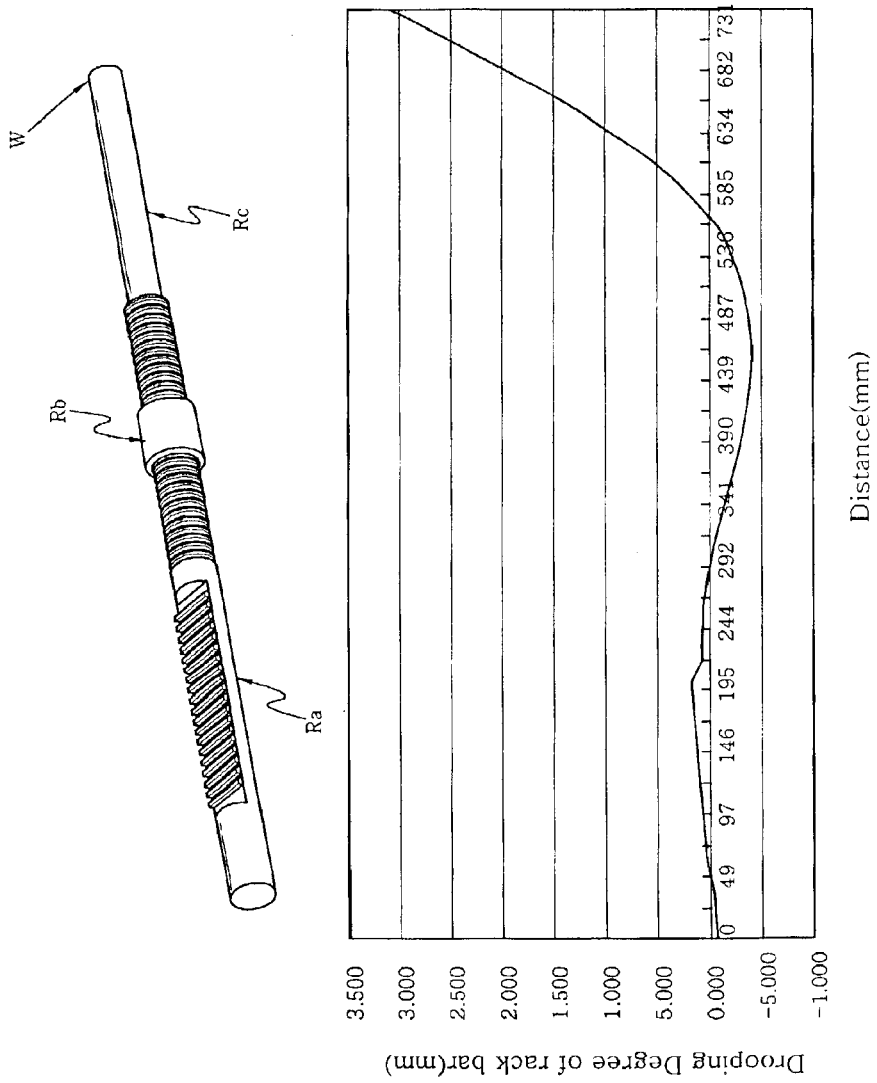
FIG. 6 is a graph of a drooping degree of a rack bar according to the present invention.

FIGS. 5 and 6 are views illustrating a drooping and drooped degree of the rack bar according to the present invention. A highest repulsive force Rc is applied in a straight line section 151 of the rack bar 111 when a vertical weight W is applied. In the conventional art, since a ball nut is installed in the point C, the ball nut has the highest weight distribution. However, in the present invention, the ball nut 160 is installed in the intermediate portion(point b) of the rack bar 111 in which a lower load is applied compared to the portion(point c).

Namely, the bush 114 is installed in the portion which has a highest weight distribution for thereby effectively supporting the movement in an axial direction of the rack bar 111 based on a simple structure. The ball screw 150 and the ball nut 160 which transfer a driving force are installed in the portion which has a relatively low weight distribution for thereby implementing an efficient driving force transfer and preventing a decrease of the durability of the same.

At this time, in order to form the ball screw 150 in an intermediate portion of the rack bar 111, the ball screw 150 should be processed from one end side of the rack bar 111 to an intermediate portion. In this case, since the section of the ball screw 150 formed in the rack bar 111 is too longitudinally formed compared to the section in which the ball nut 160 actually operates, in order to overcome the above problem, one side of the rack bar 111 is under-cut for thereby forming a straight line section 151 which has a certain diameter smaller than that of the intermediate portion.

A rack stopper 170 is formed at both ends of the rack housing 110 in a near portion of the inner ball joint 131 for thereby limiting the movement of the rack bar 111. The rack stopper 170 which is provided in the side of the straight line section 151 is provided near the bush 114 installed in the inner side of the same and is supported thereby.

Namely, the ball screw 150 according to the present invention is distanced from the rack stopper 170. The straight line section 151 is formed in a portion in which the ball screw is provided in the conventional art. Therefore, it is possible to prevent an abnormal friction and biting due to an interference(the contact between the rack stopper and the ball stopper due to a drooping of the rack bar, and the state that the ball screw is engaged to the rack stopper) between the ball screw 150 and the rack stopper 170. And the drooping is prevented since the rack stopper 170 is supported by the bush 114. In addition, it is possible to prevent an abnormal friction even when the rack stopper 170 and the straight line section 151 are interfered.

Figure 7:
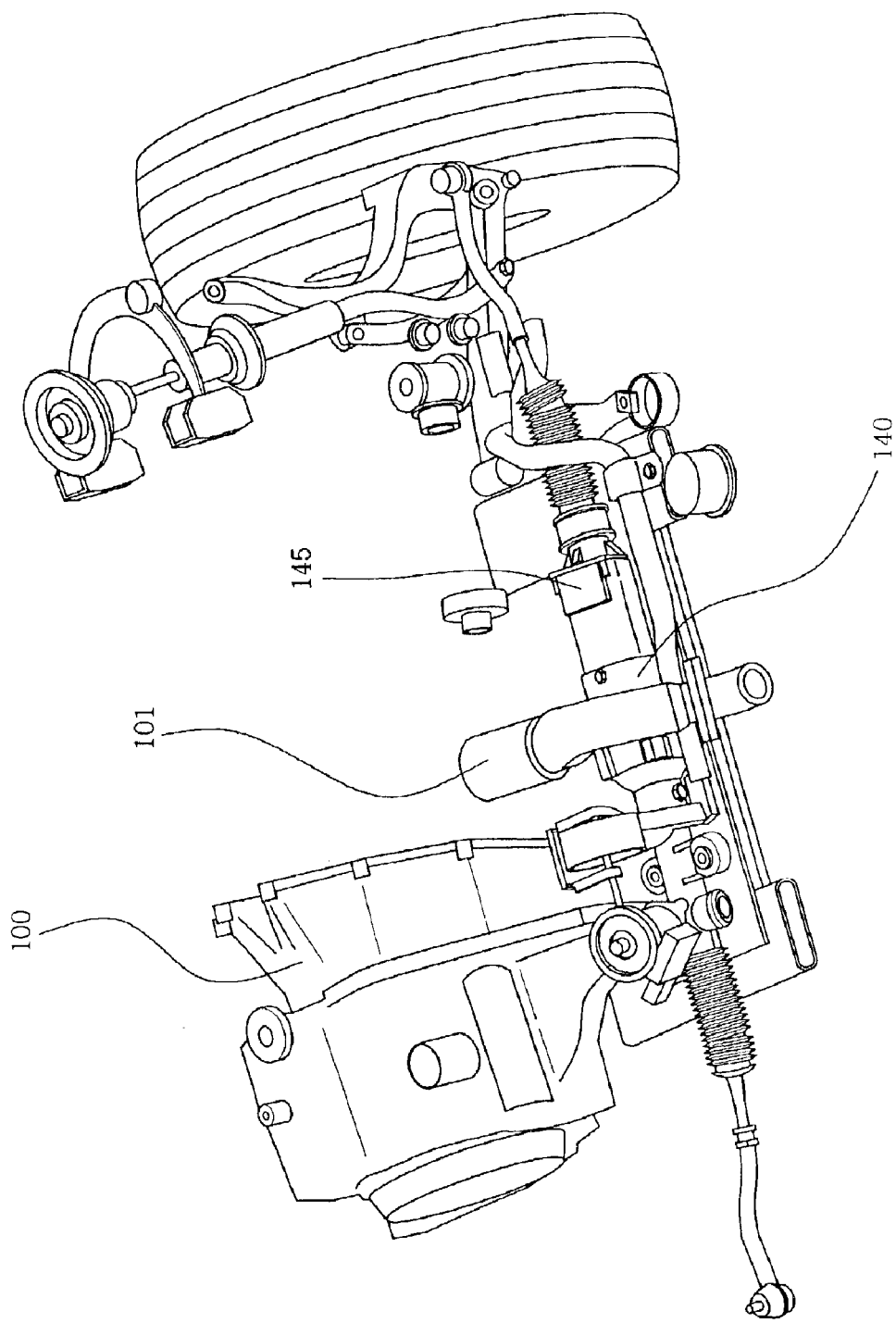
FIG. 7 is a view illustrating an installation state according to the present invention.

As shown in FIG. 7, in the present invention, a exhaust heat generated from the engine(not shown) near the mission 100 is transferred to the rear side via the intermediate portion of the rack housing 110 through exhaust pipe. The connector 145 and the sensor 146 of the motor assembly 140 are installed in one end side of each of the rack bar 111 and the motor assembly 140 for thereby being distanced far away from the heat source for thereby protecting the connector 145 and the sensor 146 of the motor assembly 140 from the heat source.

Namely, since the ball screw 150, the ball nut 160 and the motor shaft 144 are disposed in the other side end (intermediate portion of the rack bar) of the motor assembly 140 are disposed, the connector 145 and the sensor 146 of the motor assembly 140 are naturally provided in one side(one side of the rack bar) of the motor assembly 140 for thereby protecting the same from the heat source.

In the thusly constituted rack assist type electric power steering according to the present invention, when the power is supplied to the motor assembly 140 through the connector 145, the motor shaft 144 is rotated, and the ball nut 160 fixed to an end portion of the motor shaft 144 is cooperated.

In addition, the ball 161 installed between the ball screw 150 rolls based on the rotation of the ball nut 160, so that the rotational force of the ball nut 160 converts the transferring force of the axial direction of the rack bar 111, so that an energizing force occurs for thereby moving the rack bar 111.

As described above, in the rack assist type electric power steering system according to the present invention, since the ball screw is formed in the intermediate portion of the rack bar, the weight applied to the ball screw and the ball nut is decreased for thereby implementing an efficient operation of the same. In addition, it is possible to prevent a vibration and noise between the ball nut and the ball screw for thereby enhancing the durability of the same.

In addition, since the straight line section inserted into the interior of the rack stopper is formed in a plane shape, it is possible to decrease an interference between an inner surface of the rack stopper and an outer side of the straight line section, and it is possible to prevent an abnormal friction for thereby preventing a certain damage of the same.

Furthermore, since the ball screw is formed in only a section in which the ball screw is actually operated, it is possible to minimize the length of the ball screw provided based on a complicated process for thereby decreasing the fabrication cost. In addition, since the connector which supplies a power to the motor assembly and the sensor of the motor assembly are distanced from the exhaust pipe which is a heat source, it is possible to protect the same.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A rack assist type electric power steering system, comprising:
    a rack bar which includes a screw hole for connecting an inner ball joint at left and right ends in an end surface and a ball screw provided in an intermediate portion, a rack gear provided on one side of the same, and a straight line section provided on the other side of the same, said straight line section having a first diameter, said intermediate portion having a second diameter, said first diameter being smaller than said second diameter;
    an input shaft which is engaged with a pinion of a lower portion in a rack gear portion of the rack bar;
    a first rack housing which is formed in such a manner that a rack gear portion of the rack bar and the input shaft are concurrently surrounded and which has a support yoke for supporting a rear portion of the rack gear;
    a torque sensor which surrounds an upper surrounding portion of the input shaft and is fixed to an upper portion of the first rack housing;
    a second rack housing which surrounds the straight line section of the rack bar and contacts by a bush inserted into an inner diameter portion of the same; and
    a motor assembly which includes:
        a cylindrical motor housing which connects both end portions to the first rack housing and the second rack housing, respectively, between the first rack housing and the second rack housing;
        a stator which is fixed to an inner diameter portion of the motor housing;
        a hollow motor shaft which is inserted into a surrounding portion of the ball screw of the rack bar in the interior of the motor housing;
        a rotor which includes a plurality of magnets attached along an outer surrounding surface of the motor shaft;
        a ball nut which is fixed to an inner diameter of the motor shaft and includes a plurality of balls, said motor shaft including an expanded portion at one end for fixing the ball nut on the inner diameter of the motor shaft; and
        a motor assembly which includes a plurality of bearings interposed between the motor shaft and the motor housing; and
    a connector which includes a through hole in one side of the motor housing and extends a power coil of the stator through the through hole and connects the same.

2. The system of claim 1, wherein said rack bar is supported by said ball nut, said ball nut being installed in the interior of the motor assembly at its intermediate portion for thereby preventing a drooping problem, one end of the same being supported by said support yoke, said support yoke supporting a back surface of the rack gear, the other end of the same being supported by the bush interposed in the interior of the second rack housing.

3. A rack assist type electric power steering system comprising:
    a rack bar including a pair of screw holes in end surfaces at opposite ends of the rack bar for connecting respective inner ball joints to the rack bar and further including a ball screw provided in an intermediate portion of the rack bar, a rack gear provided on one side of the ball screw, and a straight line section provided on the other side of the ball screw, said straight line section having a first diameter, said intermediate portion having a second diameter, said first diameter being smaller than said second diameter;

an input shaft having a lower portion provided with a pinion engaging the rack gear of the rack bar;

a first rack housing surrounding the rack gear and the lower portion of the input shaft, said first rack housing having a support yoke for supporting a rear portion of the rack gear;

a torque sensor surrounding a portion of the input shaft and fixed to an upper portion of the first rack housing;

a second rack housing surrounding the straight line section of the rack bar, said straight line section being contacted by a bush inserted into the second rack housing; and a motor assembly which includes;
- a cylindrical motor housing connected to the first rack housing and the second rack housing and disposed between the first rack housing and the second rack housing;
- a stator fixed to an inner diameter portion of the motor housing;
- a hollow motor shaft inserted into the ball screw of the rack bar in an interior of the motor housing;
- a rotor including a plurality of magnets, said rotor being attached along an outer surface of the motor shaft;
- a ball nut fixed to the motor shaft along a small diameter portion thereof and including a plurality of balls, said motor shaft including an expanded portion at one end for fixing the ball nut to the motor shaft along the small diameter portion thereof; and
- a motor assembly including a plurality of bearings interposed between the motor shaft and the motor housing; and a connector which includes, in one side of the motor housing, a through hole via which a power coil of the stator is provided with an electrical connection.

4. The system of claim 3, wherein said rack bar is supported by said ball nut, said ball nut being installed in the interior of the motor housing at said intermediate portion of the rack bar for thereby preventing a drooping of the rack bar, one end of the rack bar being supported by said support yoke, another other end of said rack bar being supported by the bush.

* * * * *